United States Patent
Hodge et al.

(10) Patent No.: US 12,346,272 B2
(45) Date of Patent: *Jul. 1, 2025

(54) SYSTEM AND METHOD FOR FACILITATING ON-DEMAND PAGING IN A NETWORK INTERFACE CONTROLLER (NIC)

(71) Applicant: Hewlett Packard Enterprise Development LP, Spring, TX (US)

(72) Inventors: Hess M. Hodge, Seattle, WA (US); Igor Gorodetsky, Coquitlam (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/539,907

(22) Filed: Dec. 14, 2023

(65) Prior Publication Data
US 2024/0113961 A1    Apr. 4, 2024

Related U.S. Application Data

(63) Continuation of application No. 17/594,717, filed as application No. PCT/US2020/024244 on Mar. 23, 2020, now Pat. No. 11,848,859.
(Continued)

(51) Int. Cl.
*G06F 13/16*    (2006.01)
*G06F 9/50*    (2006.01)
(Continued)

(52) U.S. Cl.
CPC .......... *G06F 13/1642* (2013.01); *G06F 9/505* (2013.01); *G06F 9/546* (2013.01);
(Continued)

(58) Field of Classification Search
CPC ............. G06F 12/0862; G06F 12/1036; G06F 12/1063; G06F 13/14; G06F 13/16;
(Continued)

(56) References Cited

U.S. PATENT DOCUMENTS 6,321,276 B1 * 11/2001 Forin .................. G06F 16/9014
710/5
9,239,804 B2 * 1/2016 Kegel ................. G06F 12/1081
(Continued)

*Primary Examiner* — Eric T Oberly
(74) *Attorney, Agent, or Firm* — Dickinson Wright

(57) ABSTRACT

A network interface controller (NIC) capable of on-demand paging is provided. The NIC can be equipped with a host interface, an operation logic block, and an address logic block. The host interface can couple the NIC to a host device. The operation logic block can obtain from a remote device, a request for an operation based on a virtual memory address. The address logic block can obtain, from the operation logic block, a request for an address translation for the virtual memory address and issue an address translation request to the host device via the host interface. If the address translation is unsuccessful, the address logic block can send a page request to a processor of the host device via the host interface. The address logic block can then determine that a page has been allocated in response to the page request and reissue the address translation request.

20 Claims, 7 Drawing Sheets

Related U.S. Application Data

(60) Provisional application No. 62/852,289, filed on May 23, 2019, provisional application No. 62/852,273, filed on May 23, 2019, provisional application No. 62/852,203, filed on May 23, 2019.

(51) Int. Cl.

| | |
|---|---|
| *G06F 9/54* | (2006.01) |
| *G06F 12/0862* | (2016.01) |
| *G06F 12/1036* | (2016.01) |
| *G06F 12/1045* | (2016.01) |
| *G06F 13/28* | (2006.01) |
| *G06F 13/38* | (2006.01) |
| *G06F 13/40* | (2006.01) |
| *G06F 13/42* | (2006.01) |
| *G06F 15/173* | (2006.01) |
| *H04L 45/00* | (2022.01) |
| *H04L 45/028* | (2022.01) |
| *H04L 45/125* | (2022.01) |
| *H04L 45/42* | (2022.01) |
| *H04L 45/745* | (2022.01) |
| *H04L 47/10* | (2022.01) |
| *H04L 47/11* | (2022.01) |
| *H04L 47/12* | (2022.01) |
| *H04L 47/122* | (2022.01) |
| *H04L 47/20* | (2022.01) |
| *H04L 47/22* | (2022.01) |
| *H04L 47/24* | (2022.01) |
| *H04L 47/2441* | (2022.01) |
| *H04L 47/2466* | (2022.01) |
| *H04L 47/2483* | (2022.01) |
| *H04L 47/30* | (2022.01) |
| *H04L 47/32* | (2022.01) |
| *H04L 47/34* | (2022.01) |
| *H04L 47/52* | (2022.01) |
| *H04L 47/62* | (2022.01) |
| *H04L 47/625* | (2022.01) |
| *H04L 47/6275* | (2022.01) |
| *H04L 47/629* | (2022.01) |
| *H04L 47/76* | (2022.01) |
| *H04L 47/762* | (2022.01) |
| *H04L 47/78* | (2022.01) |
| *H04L 47/80* | (2022.01) |
| *H04L 49/00* | (2022.01) |
| *H04L 49/101* | (2022.01) |
| *H04L 49/15* | (2022.01) |
| *H04L 49/90* | (2022.01) |
| *H04L 49/9005* | (2022.01) |
| *H04L 67/1097* | (2022.01) |
| *H04L 69/22* | (2022.01) |
| *H04L 69/40* | (2022.01) |
| *H04L 45/28* | (2022.01) |
| *H04L 45/7453* | (2022.01) |
| *H04L 69/28* | (2022.01) |

(52) U.S. Cl.
CPC ...... *G06F 12/0862* (2013.01); *G06F 12/1036* (2013.01); *G06F 12/1063* (2013.01); *G06F 13/16* (2013.01); *G06F 13/1673* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 45/028* (2013.01); *H04L 45/125* (2013.01); *H04L 45/22* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(58) Field of Classification Search
CPC ............. G06F 13/1642; G06F 13/1673; G06F 13/1689; G06F 13/28; G06F 13/385; G06F 13/4022; G06F 13/4068; G06F 13/4221; G06F 13/4265; G06F 2212/50; G06F 2213/0026; G06F 2213/3808
USPC .......................... 710/3–5, 9, 62; 711/206–209
See application file for complete search history.

(56) References Cited

U.S. PATENT DOCUMENTS

| | | | |
|---|---|---|---|
| 9,286,236 B2 * | 3/2016 | Auernhammer | G06F 12/1081 |
| 10,241,925 B2 * | 3/2019 | Mirza | G06F 12/1009 |
| 2016/0259680 A1 * | 9/2016 | Evans | G06F 11/0793 |
| 2018/0011651 A1 * | 1/2018 | Sankaran | G06F 12/1009 |
| 2019/0205263 A1 * | 7/2019 | Fleming | G06F 12/1054 |

\* cited by examiner

SYSTEM AND METHOD FOR FACILITATING ON-DEMAND PAGING IN A NETWORK INTERFACE CONTROLLER (NIC)

CROSS REFERENCE TO RELATED APPLICATIONS

This application is a continuation of U.S. patent application Ser. No. 17/594,717, filed on Oct. 27, 2021, which application is a national stage of International Application No. PCT/US2020/024244, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating on-demand paging in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of on-demand paging is provided. The NIC can be equipped with a host interface, an operation logic block, and an address logic block. The host interface can couple the NIC to a host device. The operation logic block can obtain, from a remote device, a request for an operation based on a virtual memory address. The address logic block can obtain, from the operation logic block, a request for an address translation for the virtual memory address and issue an address translation request to the host device via the host interface. If the address translation is unsuccessful, the address logic block can send a page request to a processor of the host device via the host interface. The address logic block can then determine that a page has been allocated in response to the page request and reissue the address translation request.

BRIEF DESCRIPTION OF THE FIGURES

In the figures, like reference numerals refer to the same figure elements.

DETAILED DESCRIPTION

Figure 1:
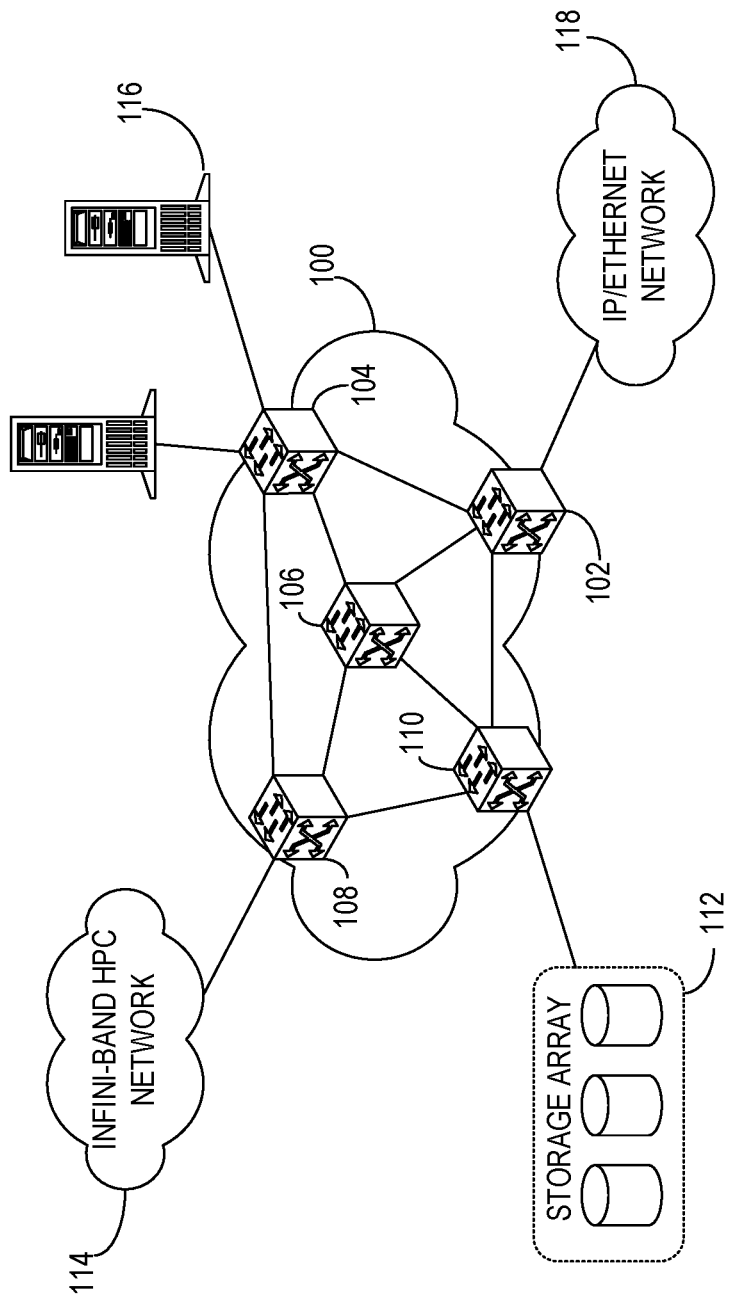
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate on-demand paging in a network interface controller (NIC). The NIC allows a host to communicate with a data-driven network. The network can accommodate dynamic data traffic with fast, effective congestion control by maintaining state information of individual packet streams. More specifically, packets injected into the network of switches can be categorized into streams, which can be mapped to their layer-2, layer-3, or other protocol-specific header information. Each stream can be marked by a distinctive identifier that is local to an input port of a switch, and provided with a stream-specific input buffer so that each stream can be individually flow-controlled. In addition, packets of a respective stream can be acknowledged upon reaching the egress point of the network, and the acknowledgment packets can be sent back to the ingress point of the stream along the same data path in the reverse direction. As a result, each switch can obtain state information of active packet streams it is forwarding and can perform highly responsive, stream-specific flow control. Such flow control can allow the network to operate at higher capacity while providing versatile traffic-engineering capabilities.

The embodiments described herein solve the problem of facilitating efficient on-demand paging in a NIC by (i) dynamically requesting for page allocation for a failed address translation request, and (ii) reissuing, from the NIC, the failed address translation request upon determining that a page corresponding to the request has been allocated.

During operation, an application, which may run on a host computing device of a NIC, can generate a data operation (e.g., a "GET" or a "PUT" command of remote direct memory access (RDMA)) for a memory location of a remote device. The operation may represent the remote memory location using a virtual address. The operation, such as a read or a write, is usually performed on data at the location indicated by the virtual address. Such a remote memory reference can require an address translation from the virtual address to a physical memory address of the remote device.

To facilitate the address translation, the NIC can look up the virtual address in a local cache. However, the lookup operation may lead to a cache miss for the virtual address (i.e., a translation for the virtual address may not be present in the cache). Consequently, the NIC can use an address translation service of the host device to resolve the address translation request and provide the address translation to the NIC.

To facilitate dynamic paging, the NIC can be equipped with an address translation unit (ATU) that may send a dynamic page request to the processor of the host device. Upon receiving the operation, the NIC can allocate the operation to a corresponding operational unit. For example, if the operation is a PUT operation, the operational unit can be an inbound engine. The operational unit can then issue a memory address translation request to the ATU for the virtual memory address specified in the operation. If the ATU does not have the address in its cache, looking up the virtual memory address in the cache can cause a cache miss. The ATU can then issue an address translation request to the host device. If the NIC is coupled to the host device via a peripheral component interconnect express (PCIe) interface, the ATU can issue a PCIe read request to the host device to obtain the address translation.

If a page associated with the virtual memory address has not been allocated to the system memory of the host device, the address translation request would lead to a lookup failure. The processor may provide a notification regarding the failure via a response queue in the ATU of the NIC. The processor can issue a PCIe completion response to the read request into the response queue. Upon detecting the failure from the response queue, the ATU can store the translation request in a local buffer and send a page request to the processor for memory allocation for a page associated with the virtual memory address. In other words, the ATU can send a page request for mapping the virtual memory address to the system memory. The ATU can issue a PCIe write operation to a location in the memory device of the host device (e.g., in a processor buffer dedicated for peripheral devices to write into). The ATU can then issue an interrupt to notify the processor regarding the presence of a new page allocation request.

The processor can read the page request from the buffer and allocate the page associated with the virtual memory address to a memory location of the system memory. The processor can set a value in a register of the NIC to notify the ATU that the page has been allocated in the system memory. The ATU can then obtain the translation request from the local buffer and insert the translation request into a retry queue that can store translation requests to be reissued. Based on a selection policy, the request can be reselected from the retry queue. The ATU can then reissue the address translation request to the processor. Since the corresponding page has been allocated in the system memory, the processor can provide the address translation to the response queue. Upon obtaining the address translation from the response queue, the ATU can determine a successful address resolution and store the mapping between the virtual address and the corresponding physical address in the cache. In this way, the ATU can facilitate dynamic paging to ensure efficient operation management in the NIC.

One embodiment of the present invention provides a NIC that can be equipped with a host interface, an operation logic block, and an address logic block. The host interface can couple the NIC to a host device. The operation logic block can obtain, from a remote device, a request for an operation based on a virtual memory address. The address logic block can obtain, from the operation logic block, a request for an address translation for the virtual memory address and issue an address translation request to the host device via the host interface. If the address translation is unsuccessful, the address logic block can send a page request to a processor of the host device via the host interface. The address logic block can then determine that a page has been allocated in response to the page request and reissue the address translation request.

In a variation on this embodiment, the address logic block can send the page request to the processor by inserting the page request into a buffer in a memory device of the host and issuing an interrupt for the processor.

In a variation on this embodiment, the address translation request is based on one of: (i) a peripheral component interconnect express (PCIe) page request services (PRS), and (ii) a page request interface (PRI) of the NIC.

In a variation on this embodiment, if the address translation is unsuccessful, the address logic block can store the address translation request in a buffer in the NIC.

In a further variation, to reissue the address translation request, the address logic block can obtain the address translation request from the buffer and store the address translation request in a retry queue, which stores requests to be reissued.

In a variation on this embodiment, the address logic block can determine that the page has been allocated based on a value in a local register.

In a variation on this embodiment, the page request includes a request for allocating a memory location for the page associated with the virtual memory address.

In a variation on this embodiment, the address logic block can store a mapping between the virtual memory address and a physical memory address in a local cache of the NIC.

In a variation on this embodiment, the operation is associated with a remote direct memory access (RDMA) command directed to the virtual memory address.

In a variation on this embodiment, the address logic block can issue an error code in response to determining an unsuccessful page allocation.

Figure 2A:
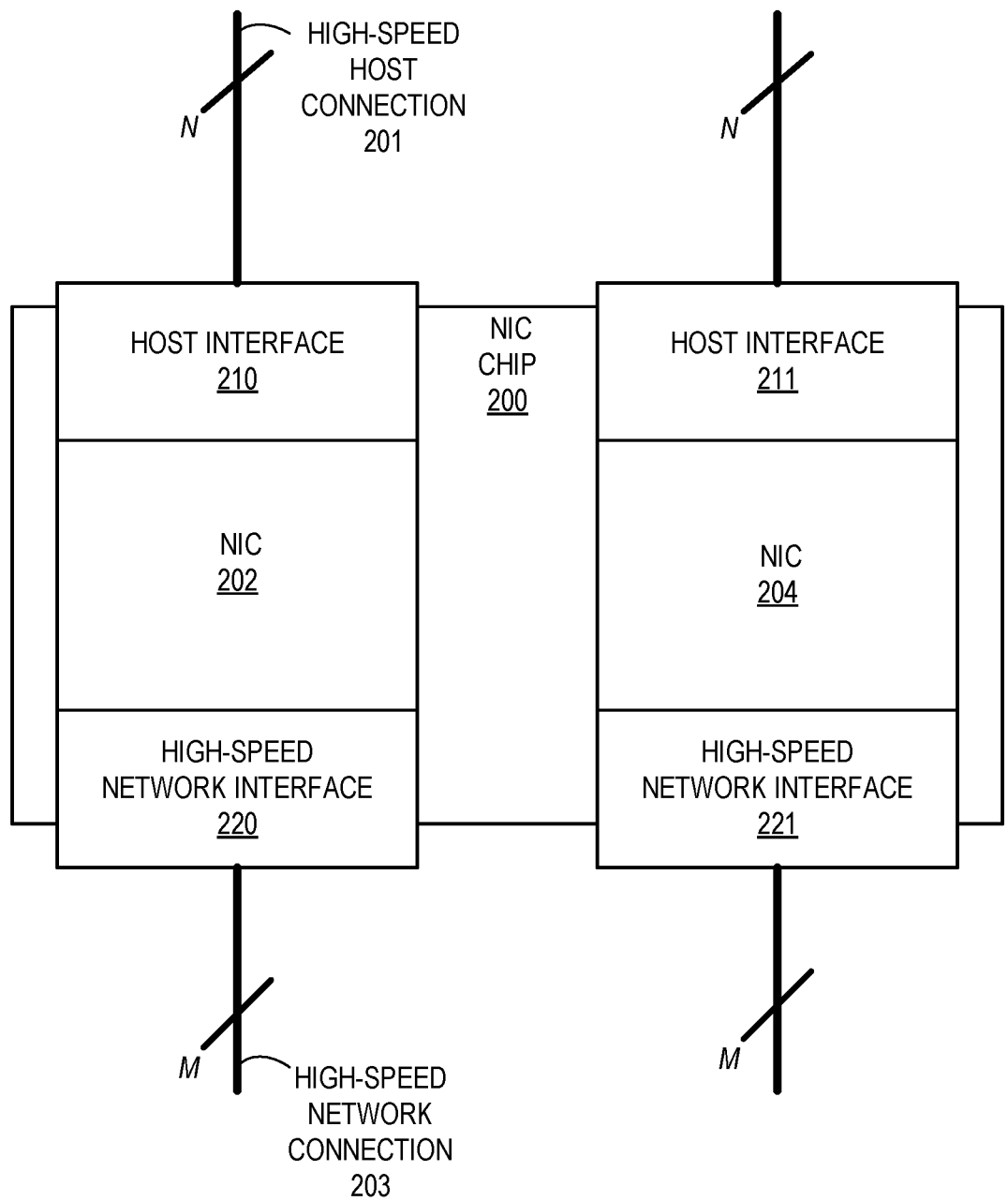
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient management of idempotent operations.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
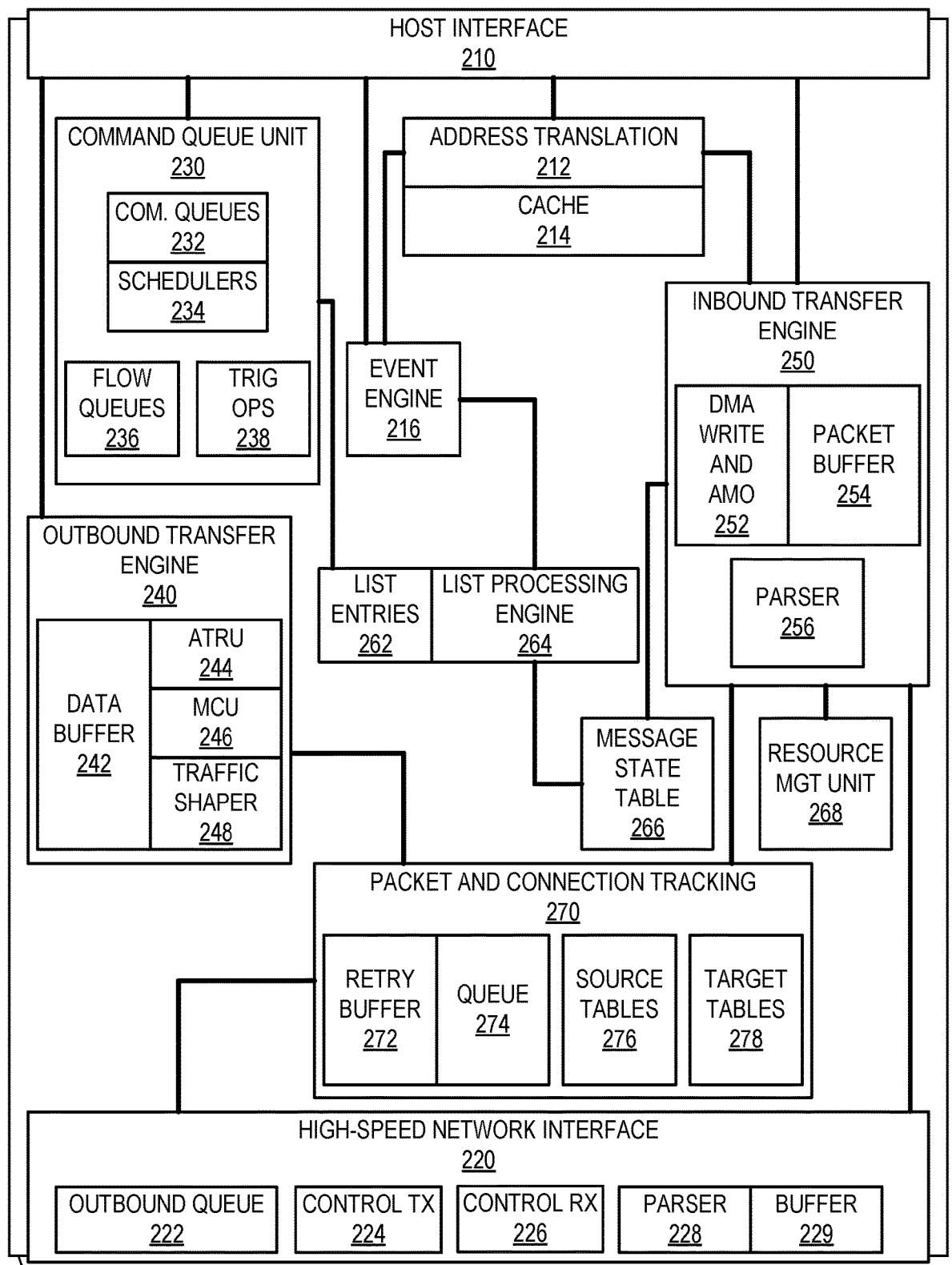
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Efficient Address Translation in NIC

Figure 3:
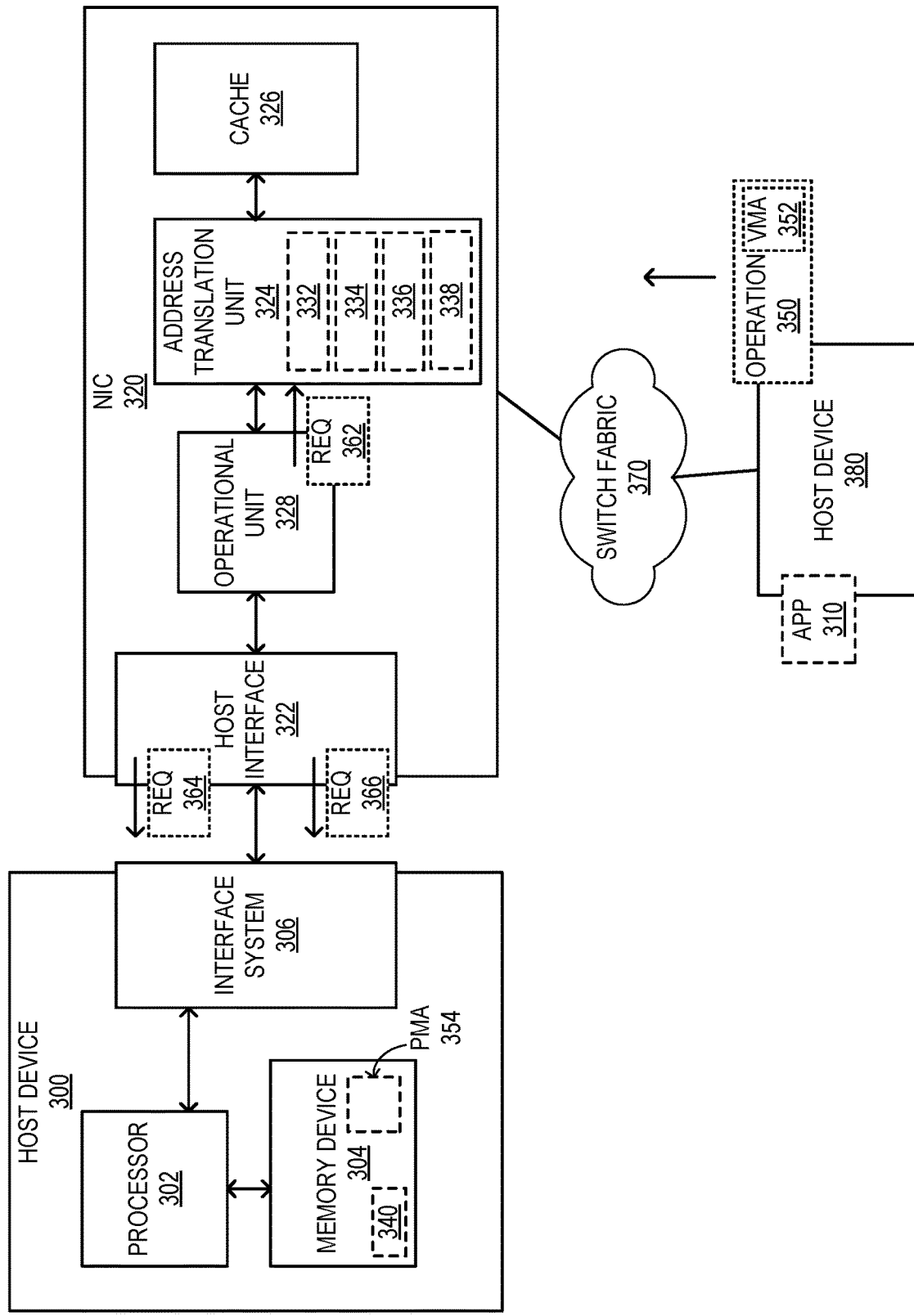
FIG. 3 shows exemplary efficient address translation in a NIC.

FIG. 3 shows exemplary efficient address translation in a NIC. In this example, host device 300 can include a NIC 320. Host device 300 can include a processor 302, a memory device 304 (e.g., the system memory), and an interface system 306. An HI 322 of NIC 320 may couple NIC 320 with device 300 and facilitate the communication between device 300 and NIC 320. For example, if HI 322 is a PCIe interface, interface system 306 can be a PCIe system that provides a slot for HI 322. NIC 320 can include an ATU 324 and a cache 326. Host device 300 can be coupled to a remote host device 380 via a switch fabric 370. During operation, an application 310 running on device 380 can generate a data operation 350 (e.g., an RDMA operation) for a memory location of device 300. Operation 350 may represent the remote memory location using a virtual memory address (VMA) 352. Operation 350 can be performed on data at the location indicated by VMA 352. Such a remote memory reference can require an address translation from VMA 352 to a physical address of the remote device.

To facilitate the address translation, NIC 320 can look up VMA 352 in cache 326. However, the lookup operation may lead to a cache miss for VMA 352 (i.e., a translation for VMA 352 may not be present in cache 326). Consequently, NIC 320 can an address translation service of device 300 to resolve the address translation request for VMA 352 and provide the address translation to NIC 320.

To facilitate dynamic paging, ATU 324 may send a page request to processor 302. Upon receiving operation 350, NIC 320 can allocate operation 350 to a corresponding operational unit 328. For example, if operation 350 is a PUT operation, operational unit 328 can be an IXE. Operational unit 328 can then issue a memory address translation request 362 to ATU 324 for VMA 352. If ATU 324 does not have VMA 352 in cache 326, looking up VMA 352 in the cache can cause a cache miss. ATU 324 can then issue an address translation request 364 to device 300. Translation request 364 can be based on a page PCIe request services (PRS) or a page request interface (PRI) of NIC 320. ATU can store translation request 364 in an outstanding translation buffer (OTB) 332. If a page associated with VMA 352 has not been allocated to memory device 304, translation request 364 would lead to a lookup failure.

Processor 302 may provide a notification regarding the failure via a response queue 334 in ATU 324. For example, processor 302 can insert a PCIe read response to response queue 334. Upon detecting the failure from response queue 332, ATU 324 can obtain translation request 364 from OTB 332 and store it in a page request buffer (PRB) 336. ATU 324 can then send a page request 366 to processor 302 for memory allocation for a page associated with VMA 352. ATU can issue a PCIe write operation to a location in memory device 304. In some embodiments, the memory location can be a processor buffer 340 dedicated for peripheral devices to write into. ATU 324 can then issue an interrupt to notify processor 302 regarding the presence of a new page allocation request in buffer 340.

Processor 302 can read page request 366 from buffer 340 and allocate the page associated with VMA 352 to a memory location of memory device 304. The memory location can be identified by a physical memory address (PMA) 354. Processor 302 can set a value in a register (e.g., a control and status register (CSR)) of NIC 320 to notify ATU 324 that the page has been allocated in memory device 304. ATU can then obtain translation request 364 from PRB 336 and insert translation request 364 into a retry queue 338 that can store translation requests that are to be retried. Based on a selection policy, translation request 364 can be reselected from retry queue 338.

ATU 324 can then reissue translation request 364 to processor 302. Since the corresponding page has been allocated in memory device 304, processor 302 can provide the address translation to response queue 334. Upon obtaining the address translation from response queue 334, ATU 324 can determine a successful address resolution and store the mapping between VMA 352 and PMA 344 in cache 326. ATU 324 can then provide the address translation to operation unit 328 for processing operation 350. In this way, the ATU can facilitate dynamic paging to ensure efficient operation management in NIC 320.

Figure 4A:
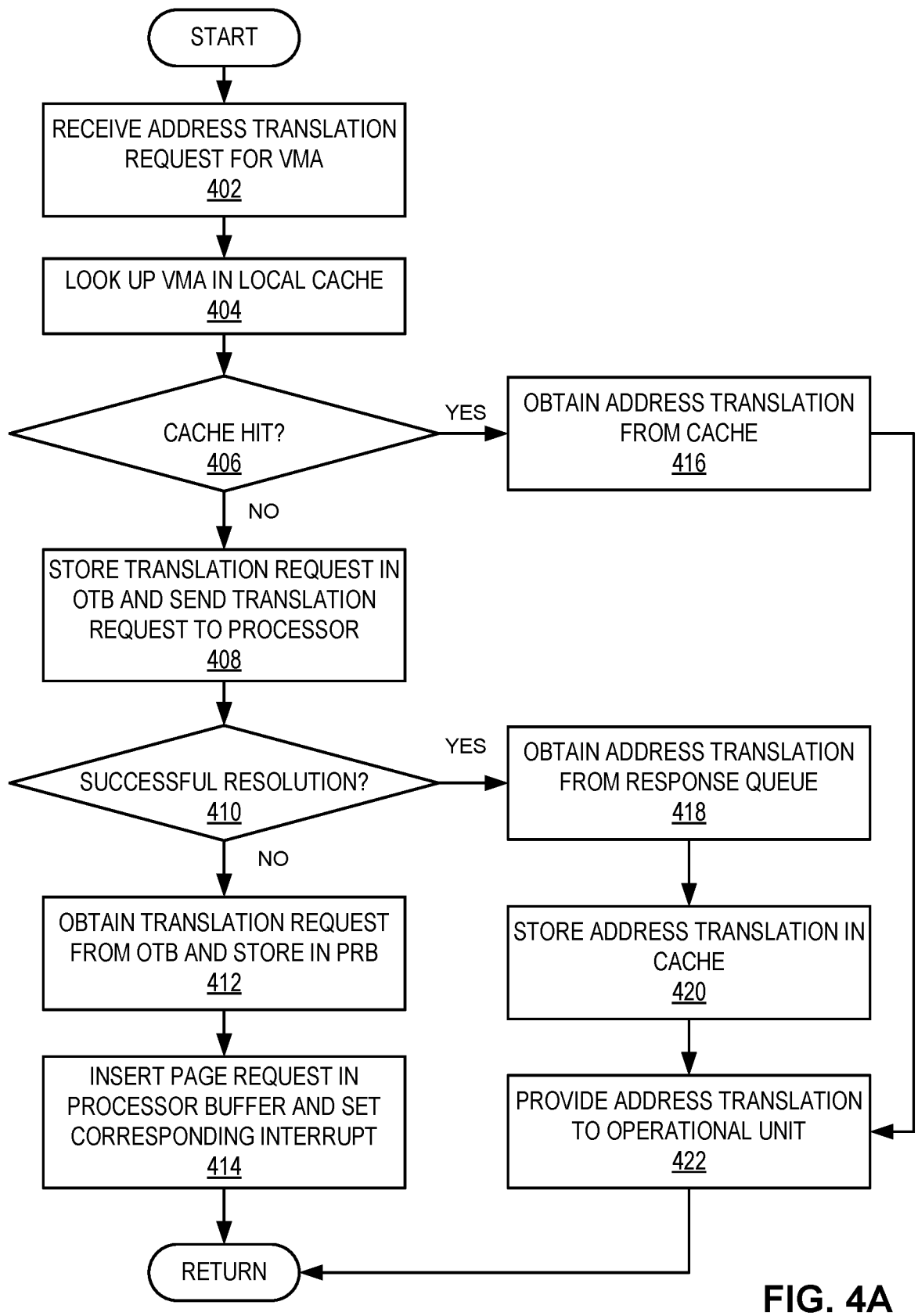
FIG. 4A shows a flow chart of a request management process for on-demand paging in a NIC.

FIG. 4A shows a flow chart of a request management process for on-demand paging in a NIC. During operation, an ATU of the NIC can receive an address translation request (e.g., from another operational unit) (operation 402) and look up the VMA in the local cache (operation 404). The ATU can then determine whether a cache hit has occurred (operation 406). If a cache hit has occurred, the ATU can obtain the address translation from the cache (operation 416). On the other hand, for a cache miss, the ATU can store the translation request in an OTB and send a translation request to the processor (operation 408). The ATU can then determine whether a successful address resolution has been received at a response queue (operation 410).

If a successful address resolution has been received, the ATU can obtain the address translation from the response queue (operation 418) and store the address translation in the cache (operation 420). Upon obtaining the address translation from the cache (operation 416) or storing the address translation in the cache (operation 420), the ATU can provide the address translation to the operational unit (operation 422). On the other hand, if a successful address resolution has not been received, the ATU can obtain the translation request from the OTB and store the translation request in the PRB (operation 412). The ATU can then inset a page request in the processor buffer (e.g., in the memory of the host device) and set a corresponding interrupt (operation 414).

Figure 4B:
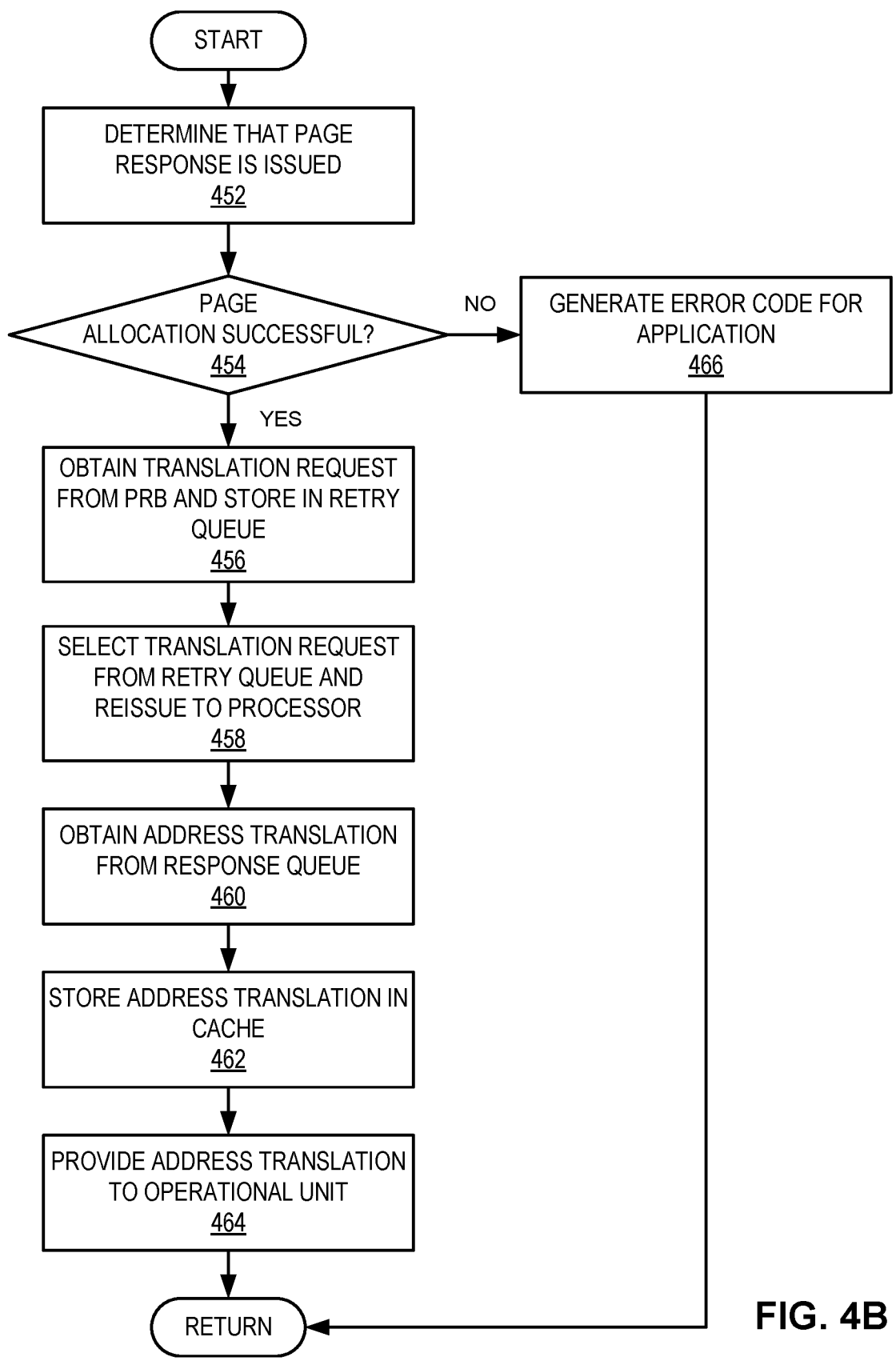
FIG. 4B shows a flow chart of a response management process for on-demand paging in a NIC.

FIG. 4B shows a flow chart of a response management process for on-demand paging in a NIC. During operation, an ATU of the NIC can determine that a page response is issued (e.g., based on an entry in a CSR in the NIC) (operation 452). The ATU can determine whether the page allocation has been successful (operation 454). If the page allocation has not been successful, the ATU can generate an error code for the application (operation 466). On the other hand, if the page allocation has been successful, the ATU can obtain the translation request from the PRB and store the translation request in the retry queue (operation 456).

The ATU can then select the translation request from the retry queue and reissue the translation request to the processor (operation 458). Since the page allocation has been successful, the ATU can obtain the address translation from the response queue (operation 460) and store the address translation in the cache (operation 462). The ATU can then provide the address translation to the operational unit (operation 464).

Exemplary Computer System

Figure 5:
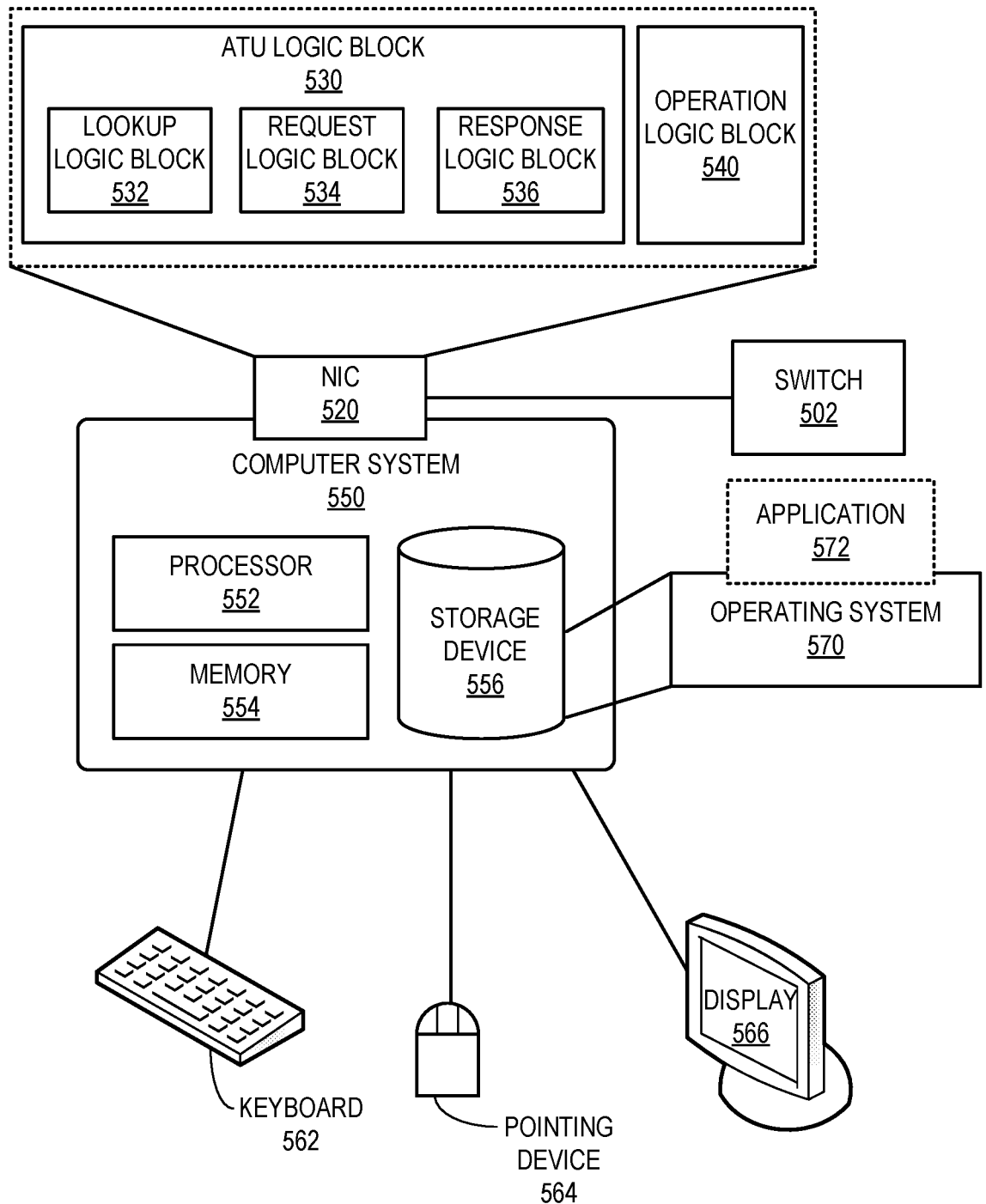
FIG. 5 shows an exemplary computer system equipped with a NIC that facilitates on-demand paging.

FIG. 5 shows an exemplary computer system equipped with a NIC that facilitates efficient packet forwarding. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an ATU logic block 530 (e.g., in an ATU of NIC 520) and an operation logic block 540. ATU logic block 530 can facilitate address translation services in NIC 520, and may include a lookup logic block 532, a request logic block 534, and a response logic block 536.

Lookup logic block 532 can receive an address translation request from operation logic block 540 and look up the address in a local cache. Request logic block 534 can send a translation request to processor 552 for an address resolution and a page request for dynamic page allocation. Request logic block 534 may also reissue the translation request. Response logic block 536 can obtain an address translation from processor 552. Accordingly, response logic block 536 can insert the address translation in the local cache and provide the mapping to an operational unit.

In summary, the present disclosure describes a NIC that facilitates on-demand paging. The NIC can be equipped with a host interface, an operation logic block, and an address logic block. The host interface can couple the NIC to a host device. The operation logic block can obtain, from a remote device, a request for an operation based on a virtual memory address. The address logic block can obtain, from the operation logic block, a request for an address translation for the virtual memory address and issue an address translation request to the host device via the host interface. If the address translation is unsuccessful, the address logic block can send a page request to a processor of the host device via the host interface. The address logic block can then determine that a page has been allocated in response to the page request and reissue the address translation request.

The methods and processes described above can be performed by hardware logic blocks, modules, logic blocks, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
one or more processors operable to execute machine-readable instructions to cause the NIC to:
obtain a request for an address translation for a virtual memory address;
issue an address translation request to a host device;
in response to determining an unsuccessful address translation, send a page request to the host device and store the address translation request in a buffer of the NIC;
in response to determining a page has been allocated for the page request, obtain the address translation request from the buffer and store the address translation request in a retry queue of the NIC; and
select the address translation request from the retry queue to reissue the address translation request.

2. The NIC of claim 1, wherein sending the page request to the host device comprises:
inserting the page request into a buffer of the host device; and
issuing an interrupt for the host device.

3. The NIC of claim 1, wherein the address translation request is based on one of:
a peripheral component interconnect express (PCIe) page request services (PRS); and
a page request interface (PRI) of the NIC.

4. The NIC of claim 1, wherein the one or more processors are operable to execute further machine-readable instructions to cause the NIC to determine that the page has been allocated based on a value in a local register.

5. The NIC of claim 1, wherein the page request includes a request for allocating a memory location for the page associated with the virtual memory address.

6. The NIC of claim 1, wherein the one or more processors are operable to execute further machine-readable instructions to cause the NIC to store a mapping between the virtual memory address and a physical memory address in a local cache.

7. The NIC of claim 1, wherein:
the one or more processors are operable to execute further machine-readable instructions to cause the NIC to obtain, from a remote device, a request for an operation based on the virtual memory address; and the operation is associated with a remote direct memory access (RDMA) command directed to the virtual memory address.

8. The NIC of claim 1, wherein the one or more processors are operable to execute further machine-readable instructions to cause the NIC to issue an error code in response to determining an unsuccessful page allocation.

9. A method, comprising:
identifying a request for an address translation for a virtual memory address;
issuing an address translation request to a host device and storing the address translation request in an outstanding translation buffer of a network interface controller (NIC);
in response to determining an unsuccessful address translation, sending a page request to the host device and moving the address translation request from the outstanding translation buffer to a page request buffer of the NIC;
in response to determining a page has been allocated for the page request, moving the address translation request from the page buffer request to a retry queue of the NIC; and
selecting the address translation request from the retry queue to reissue the address translation request.

10. The method of claim 9, wherein sending the page request to the host device comprises:
inserting the page request into a buffer of the host device.

11. The method of claim 9, wherein the address translation request is based on one of:
a peripheral component interconnect express (PCIe) page request services (PRS); and
a page request interface (PRI) of the NIC.

12. The method of claim 9, further comprising determining that the page has been allocated based on a value in a local register of the NIC.

13. The method of claim 9, wherein the page request includes a request for allocating a memory location for the page associated with the virtual memory address.

14. The method of claim 9, further comprising storing a mapping between the virtual memory address and a physical memory address.

15. The method of claim 9, further comprising:
obtaining, by the NIC, a request for an operation based on the virtual memory address from a remote device;
wherein the operation is associated with a remote direct memory access (RDMA) command directed to the virtual memory address.

16. The method of claim 9, further comprising issuing an error code in response to determining an unsuccessful page allocation.

17. Non-transitory computer-readable medium storing instructions, which when executed by one or more processing resources of a device, cause the device to:
obtain, from a remote device, a request for an operation based on a virtual memory address;
obtain a request for an address translation for a virtual memory address;
issue an address translation request to a host device;
in response to determining an unsuccessful address translation, send a page request to the host device and store the address translation request in a buffer of the device;
in response to determining a page has been allocated for the page request, obtain the address translation request from the buffer and store the address translation request in a retry queue of the device; and
select the address translation request from the retry queue to reissue the address translation request.

18. The non-transitory computer-readable medium storing instructions of claim 17, storing further instructions which when executed by the one or more processing resources cause the device to:
in response to reissuing the address translation request, obtain an address translation from the host device; and
store the address translation in a cache of the device.

19. The non-transitory computer-readable medium storing instructions of claim 17, wherein sending the page request to the host device comprises:
inserting the page request into a buffer in a memory device of the host device; and
issuing an interrupt for the host device.

20. The non-transitory computer-readable medium storing instructions of claim 17, wherein the address translation request is based on a peripheral component interconnect express (PCIe) page request services (PRS).

* * * * *